US008290211B2

(12) United States Patent
Takahashi

(10) Patent No.: US 8,290,211 B2
(45) Date of Patent: Oct. 16, 2012

(54) APPARATUS, METHOD AND COMPUTER PRODUCT FOR GENERATING VEHICLE IMAGE

(75) Inventor: Kunikazu Takahashi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 1227 days.

(21) Appl. No.: 11/882,585

(22) Filed: Aug. 2, 2007

(65) Prior Publication Data

US 2007/0285809 A1 Dec. 13, 2007

(51) Int. Cl.
*G06K 9/00* (2006.01)

(52) U.S. Cl. ........................................ 382/104; 382/232

(58) Field of Classification Search .................. 382/104, 382/232

See application file for complete search history.

(56) References Cited

U.S. PATENT DOCUMENTS

| | | | | |
|---|---|---|---|---|
| 4,368,979 | A * | 1/1983 | Ruell | 356/71 |
| 5,809,161 | A * | 9/1998 | Auty et al. | 382/104 |
| 6,625,300 | B1 | 9/2003 | Kyo | |
| 6,747,687 | B1 * | 6/2004 | Alves | 348/148 |
| 2002/0134151 | A1 * | 9/2002 | Naruoka et al. | 73/291 |
| 2004/0165779 | A1 * | 8/2004 | Guillou et al. | 382/232 |

FOREIGN PATENT DOCUMENTS

| | | |
|---|---|---|
| JP | 7-105352 | 4/1995 |
| JP | 8-83390 | 3/1996 |
| JP | 61-176808 | 8/1996 |
| JP | 11-213284 | 8/1999 |
| JP | 2000-113201 | 4/2000 |
| JP | 2004-101470 | 3/2004 |
| JP | 2004-227034 | 8/2004 |

OTHER PUBLICATIONS

Office Action mailed on Aug. 12, 2008 and issued in corresponding Japanese Patent Application No. 2007-501479. Partial.

International Search Report of International Published Application No. PCT/JP2005/001621 (mailed Mar. 29, 2005).

* cited by examiner

*Primary Examiner* — Hadi Akhavannik

(74) *Attorney, Agent, or Firm* — Staas & Halsey LLP

(57) ABSTRACT

A recognition device includes a component identifying unit, an identification-region defining unit, a vehicle-image generating unit, and a data reduction-level setting unit. The component identifying unit identifies a component of a vehicle in an original image. The identification-region defining unit defines an identification region including an identification component for identifying the vehicle based on the component. The vehicle-image generating unit extracts the identification region and generates a vehicle image. The data reduction-level setting unit sets a data reduction level based on which a vehicle image is to be generated from an original image satisfying a predetermined condition.

15 Claims, 13 Drawing Sheets

| STATE | DATA REDUCTION LEVEL |
|---|---|
| IMPOSSIBLE TO RECOGNIZE LICENSE NUMBER | 0 |
| POSSIBLE TO RECOGNIZE LICENSE NUMBER, AND HAVE UNREGISTERED LICENSE NUMBER | 1 |
| POSSIBLE TO RECOGNIZE LICENSE NUMBER, AND HAVE REGISTERED LICENSE NUMBER | 2 |
| POSSIBLE TO RECOGNIZE LICENSE NUMBER, HAVE REGISTERED LICENSE NUMBER, AND HAVE LEFT-RIGHT SYMMETRICAL BODY | 3 |
| ⋮ | ⋮ |

APPARATUS, METHOD AND COMPUTER PRODUCT FOR GENERATING VEHICLE IMAGE

CROSS-REFERENCE TO RELATED APPLICATION

This application is based upon and claims the benefit of priority of the prior PCT Application No. PCT/JP2005/001621, filed on Feb. 3, 2005, the entire contents of which are incorporated herein by reference.

BACKGROUND OF THE INVENTION

1. Field of the Invention

The present invention relates to a technology for generating a vehicle image for identifying a vehicle.

2. Description of the Related Art

In the field of traffic monitoring, image data on vehicles traveling on a road are collected by a monitoring camera installed on the road. The image data are stored in a database with their attributes (for example, shooting date and time, and shooting location), so that the image data can be retrieved from the database when necessary.

However, because the volume of image data is generally large, the volume of image data to be stored becomes extremely large as vehicles whose images are captured by the monitoring camera increase.

As a result, the data volume reaches its maximum in a short term, and, to address such a situation, the image data are needed to be saved in a medium suitable for long storage such as a magnetooptic disk (MO) or a linear tape-open (LTO). In addition, because transmission of the image data to the database causes a high volume of data traffic, the system requires large running costs.

To solve the problems, there is a need of a technology for generating a downsized vehicle image suitable for transmission or storage from an original image of a vehicle. For example, Japanese Patent Application Laid-Open No. 2004-101470 discloses a conventional technology for, when the license plate of a vehicle is read without fails, extracting an image of the vehicle excluding a background from the original image, and generating a downsized image data based on the extracted image of the vehicle.

However, with the conventional technology, a data volume possible to be reduced is limited. An original image is shot focusing on a vehicle to be used for identifying the vehicle. That is, data volume of the background in the original image is relatively small. Removal of only the background from the original image cannot effectively reduce the data volume of the original image.

Thus, it has been focus on how to generate a vehicle image that contains information required for identifying a vehicle by removing needless data as well as the background from an original image.

SUMMARY

It is an object of the present invention to at least partially solve the problems in the conventional technology.

According to an aspect of the present invention, a vehicle image generating apparatus that generates a vehicle image for identifying a vehicle from an original image, includes an identifying unit that identifies a component of the vehicle in the original image, a defining unit that defines an identification region including an identification component for identifying the vehicle based on the component, and a generating unit that extracts the identification region from the original image, and generates the vehicle image based on extracted identification region.

According to another aspect of the present invention, a vehicle image generating method for generating a vehicle image for identifying a vehicle from an original image, includes identifying a component of the vehicle in the original image, defining an identification region including an identification component for identifying the vehicle based on the component, extracting the identification region from the original image, and generating the vehicle image based on extracted identification region.

According to still another aspect of the present invention, a computer-readable recording medium stores therein a computer program that implements the above method on a computer.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

The following terms as used herein are defined as follows:

"Original image" is data on an original image of a vehicle obtained by shooting the vehicle.

"Vehicle image" is data on an image of the vehicle downsized (data reduced) to be suitable for transmission or storing.

"Component" is positional information, in a body of the vehicle in the original image (hereinafter, "vehicle-body area"), of a point, a line, or an area that can be identified (expressed) as a part of the vehicle or a portion of the part.

"Identification component" is a specific portion of the vehicle or a part of the specific portion from which the vehicle or a model of the vehicle can be identified. The identification component includes a license plate and a manufacturer mark the whole of which identifies a vehicle or a model of a vehicle, and a bumper and a light a part of which identifies a model of a vehicle.

Figure 1:
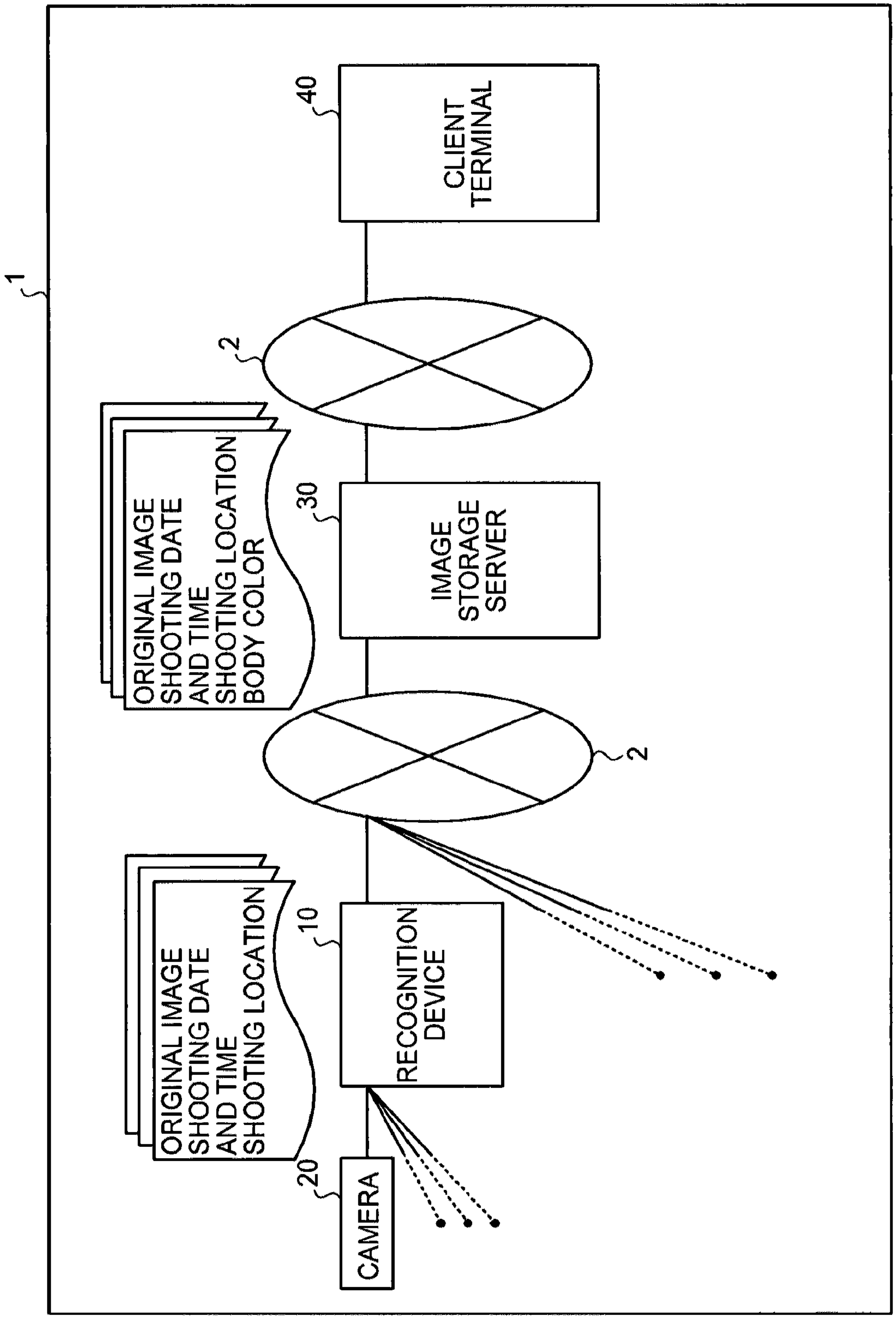
FIG. 1 is a schematic diagram of a vehicle-image management system according to an embodiment of the present invention.

FIG. 1 is a schematic diagram of a vehicle-image management system 1 according to an embodiment of the present invention.

The vehicle-image management system 1 includes a recognition device 10, an image storage server 30, and a client terminal 40, which are connected to each other via a network 2 such as the Internet or a local area network (LAN). The recognition device 10 performs a vehicle-image generating process for generating a vehicle image to be transmitted or stored based on an original image shot by a camera 20. The image storage server 30 stores therein the vehicle image transmitted by the recognition device 10. The client terminal 40 receives search conditions such as date and time, and location via an input device, and obtains an image or the color of a specific part of a vehicle satisfying the conditions from the image storage server 30.

In the vehicle-image generating process, the recognition device 10 identifies a component in an original image of a vehicle, and defines an identification region including an identification component for identifying the vehicle based on the component. The recognition device 10 extracts the identification region from the original image, and generates a vehicle image based on the extracted identification region. Thus, the vehicle image generating process effectively reduces the data volume of the original image.

More particularly, the recognition device 10 identifies the component from predetermined feature points in a vehicle-body area of the original image, or points assumed to have a high possibility of forming a specific portion of a body of the vehicle. For example, the recognition device 10 identifies side-mirror areas by matching edges of the vehicle-body area with a distinctive shape of side mirrors, detects changes in brightness in a circular range including a midpoint between the side-mirror areas as the center of the circular range, and identifies a series of points where changes in brightness are detected as a borderline of a windshield area.

As described above, by identifying the component using the predetermined feature points of the vehicle-image area in the original image, it is possible to identify the specific component based on which an identification component for identifying the vehicle is defined.

After that, the recognition device 10 defines an identification region including the identification component based on the specific component by selecting required information for identifying the vehicle while removing needless information from the vehicle-body area, extracts the identification region, and generates the vehicle image based on the extracted identification region. As a result, it is possible to generate the vehicle image including the required information for identifying the vehicle.

In the conventional technology described above, a vehicle image is generated by extracting a vehicle-body area except a background area from an original image. Consequently, the resultant vehicle image includes the needless information for identifying the vehicle. Unlike the conventional technology, according to the embodiment, a vehicle image is generated by extracting necessary information for identifying a vehicle so that the resultant vehicle image includes the necessary information. Thus, data volume can be effectively reduced.

Furthermore, the recognition device 10 does not perform the whole or part of the vehicle-image generating process for an original image that satisfies a predetermined condition.

Sometimes a client, who can receive data on stored images, may request an original image including the background area. A request from a client is issued at a later stage apart from the vehicle-image generating process. Therefore, if all original images are downsized in an identical manner, there is a possibility of lacking a part that corresponds to search conditions specified by the client at a later stage.

To solve the above problem, using predetermined conditions for determining an original image that is likely to be required by a client at a later stage, the recognition device 10 does not perform the whole or part of the vehicle-image generating process for an original image that satisfies the predetermined condition. This satisfies the request from the client who receives a vehicle image as well as effectively reducing a volume of the vehicle image.

Figure 2:
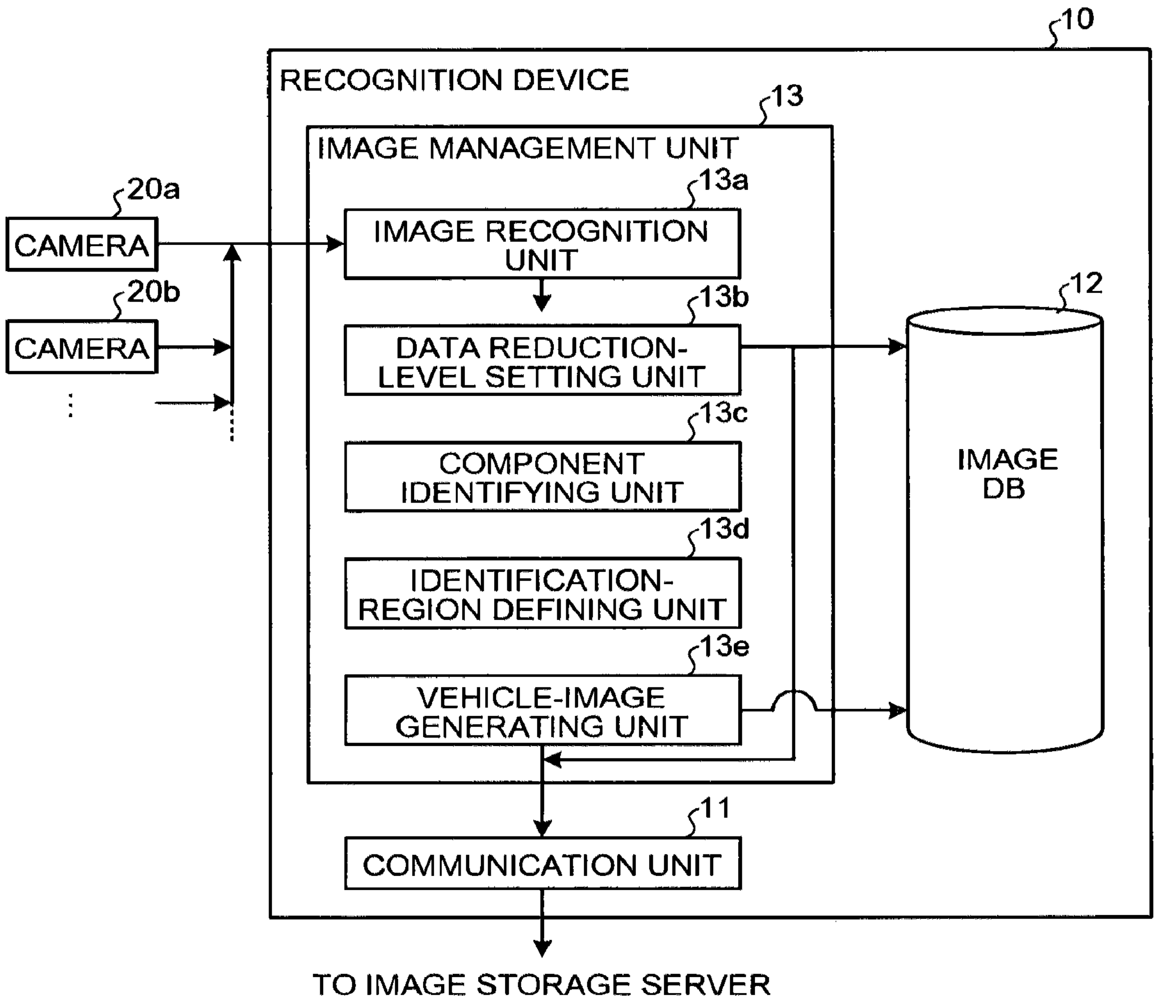
FIG. 2 is a functional block diagram of a recognition device shown in FIG. 1.

FIG. 2 is a functional block diagram of the recognition device 10. The recognition device 10 generates a vehicle image to be transmitted or stored based on an original image shot by cameras 20*a* and 20*b* (hereinafter, sometimes "camera 20") that shot a vehicle traveling on a road. The recognition device 10 includes a communication unit 11, an image database (DB) 12, and an image management unit 13. Although the camera 20 is a color camera, it can be a shooting device for monochrome capture.

The communication unit 11 communicates with the image storage server 30 via the network 2. More particularly, the communication unit 11 sends a vehicle image generated by a vehicle-image generating unit 13*e* to the image storage server 30.

The image DB 12 stores therein an original image received from the camera 20 and the vehicle image generated by the vehicle-image generating unit 13*e*. More particularly, the image DB 12 stores therein image data and attributes associated with the image data. Examples of attributes include a shooting date and time, and a shooting location.

The image management unit 13 includes an inner memory for storing programs of executing processes concerning an image of a vehicle and data used for controlling the processes, and controls the processes. The image management unit 13 includes an image recognition unit 13*a*, a data reduction-level setting unit 13*b*, a component identifying unit 13*c*, an identification-region defining unit 13*d*, and the vehicle-image generating unit 13*e*.

The image recognition unit 13*a* performs image recognition for the original image received from the camera 20, and cuts a vehicle-body area out of the original image. More particularly, with reference to examples shown in FIGS. 3 and 4, the image recognition unit 13*a* estimates a rough position of a vehicle in an original image 50 or 60, detects edges of the vehicle at the estimated position to cut a front or rear vehicle-body area out of the original image 50 or 60, corrects skews of the vehicle-body area, and extracts a license plate of the vehicle from the corrected vehicle-body area.

Moreover, the image recognition unit 13*a* checks the following three conditions (1) to (3) from a result of the image recognition and sends the results to the data reduction-level setting unit 13*b*: (1) possible to recognize all numbers and letters on a license plate, (2) a license number on the license plate is a registered one, and (3) a skew-corrected vehicle-body area has left-right symmetry.

Figure 3:
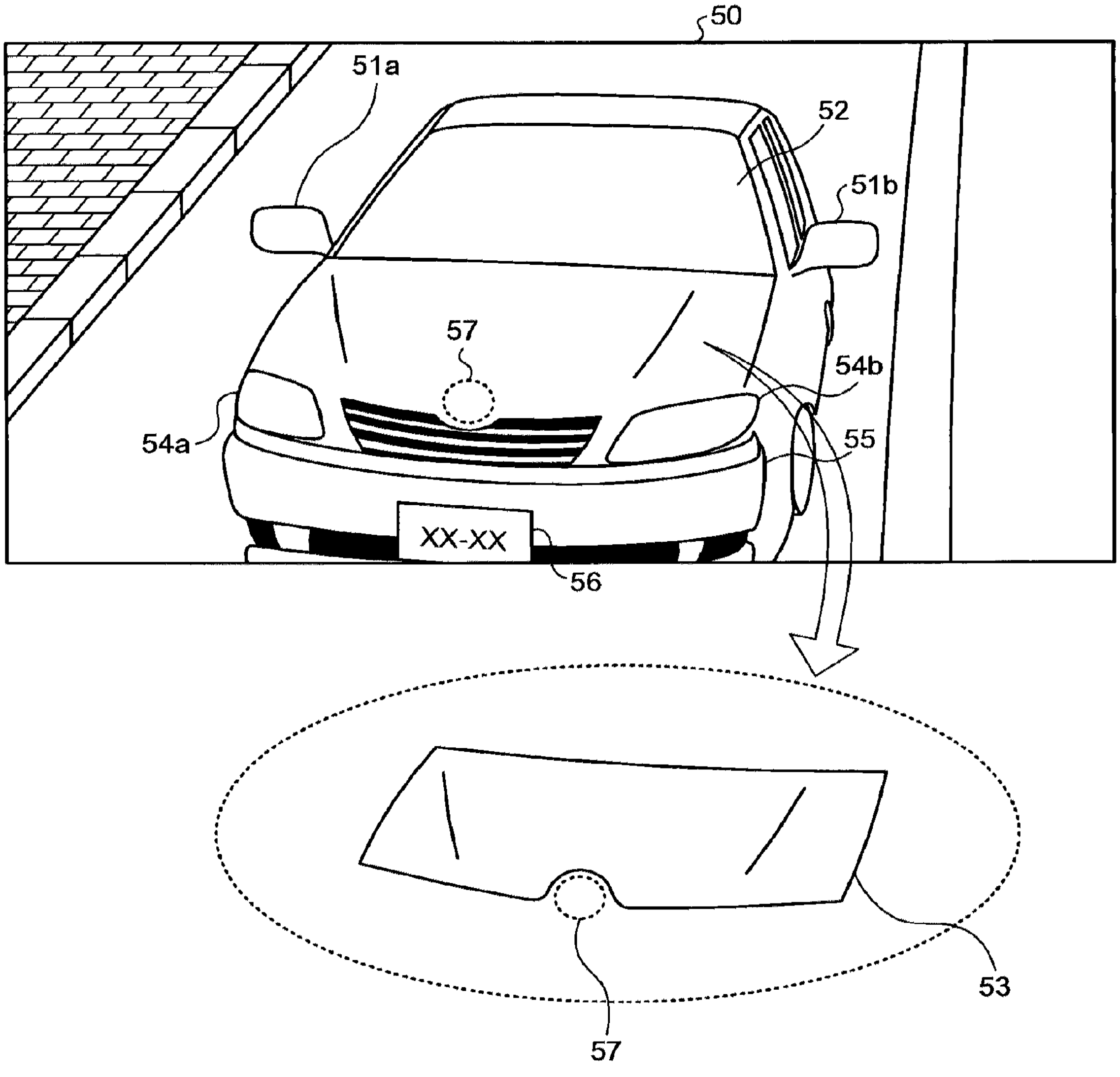
FIGS. 3 and 4 are examples of an original image.
Figure 4:
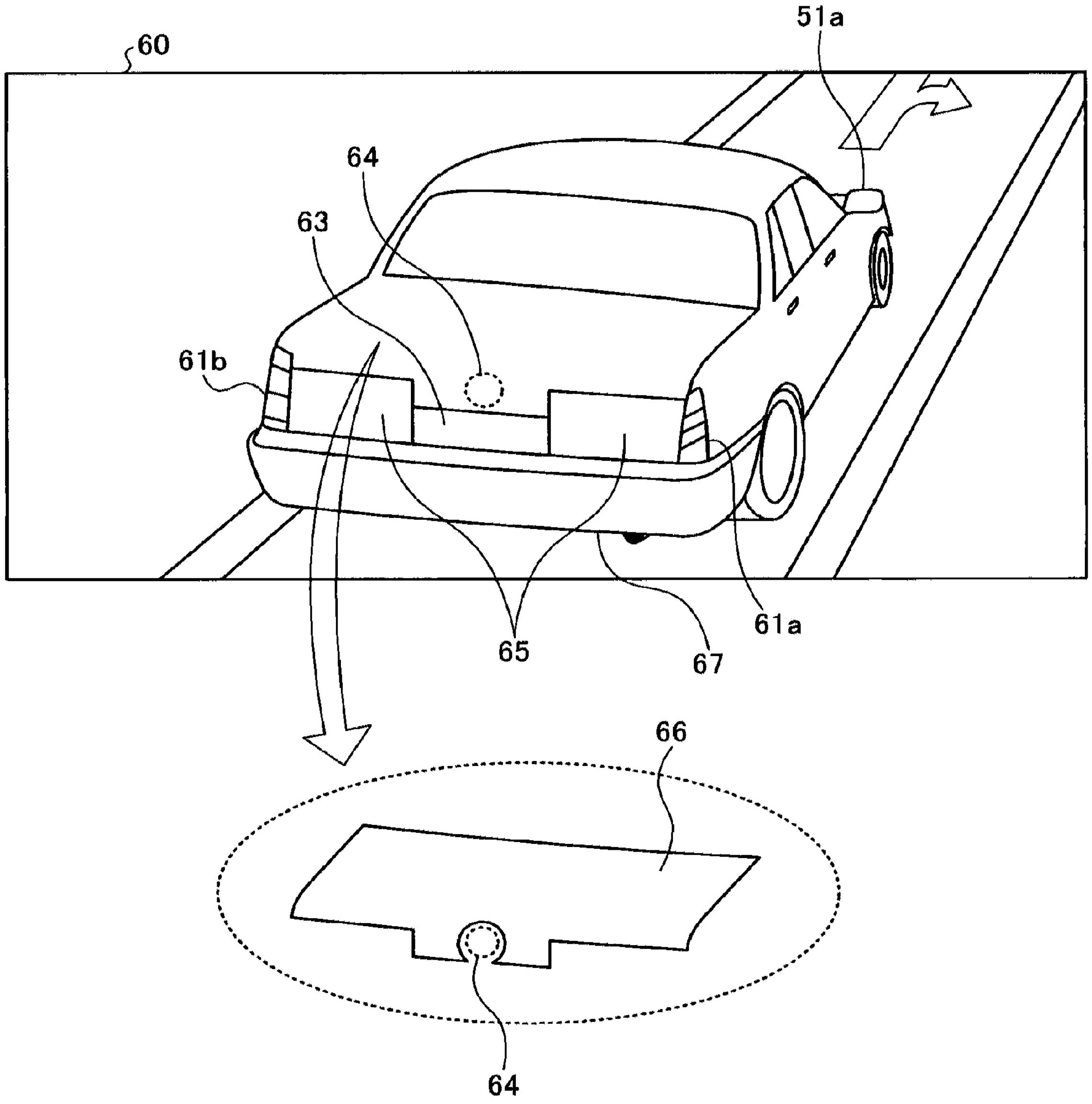

Examples of processes for generating vehicle images from the original images 50 and 60 shown in FIGS. 3 and 4 are described below. In the examples, components, parts, and a structure of a vehicle are explained on assumption that the vehicle travels forward. The original image 50 is shot by the camera 20 set on the left side above the vehicle, the original image 60 is shot by the camera 20 set in the right side above the vehicle.

Figures 5, 6:
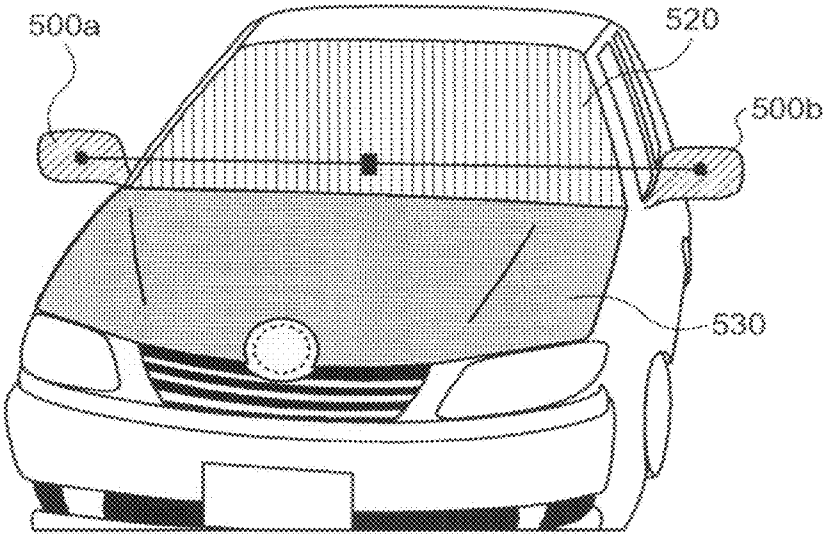
FIG. 5 is a table for explaining conditions based on which a data reduction level of the original image is set.
FIG. 6 is a schematic diagram of a vehicle-body area cut out of an original image shot from the front of a vehicle for explaining a process performed by a component identifying unit shown in FIG. 2.

The data reduction-level setting unit 13*b* does not perform, using predetermined conditions for determining an original image that is likely to be required by a client at a later stage, the whole or part of the vehicle-image generating process for an original image that satisfies the predetermined condition. More particularly, the data reduction-level setting unit 13*b* compares the results of checking the conditions (1) to (3) obtained by the image recognition unit 13*a* with a definition file as shown in FIG. 5, and sets a data reduction level based on which the identification region is defined.

More particularly, when the image recognition unit 13*a* determines that it is impossible to recognize all numbers and letters on a license plate, the data reduction-level setting unit 13*b* sets the data reduction level to 0. When it is possible to recognize all numbers and letters on a license plate and that the license number is an unregistered one, the data reduction-level setting unit 13*b* sets the data reduction level to 1.

When it is possible to recognize all numbers and letters on a license plate, that the license number is a registered one, and that the skew-corrected vehicle-body area does not have left-right symmetry, the data reduction-level setting unit 13*b* sets the data reduction level to 2.

When it is possible to recognize all numbers and letters on a license plate, that the license number is a registered one, and that the skew-corrected vehicle-body area has left-right symmetry, the data reduction-level setting unit 13*b* sets the data reduction level to 3.

That is, the data reduction level is low for a vehicle whose license number is unrecognizable. This is because it is highly possible that an original image of a vehicle the license plate of which fails to be recognized due to deformation of the license plate caused by an accident or a vehicle with a license plate that is intentionally deformed are required at a later stage.

The data reduction level is low for a vehicle whose license number is an unregistered one. This is because it is highly possible that an original image of a vehicle that has been unregistered is required for various reasons at a later stage.

The data reduction level is low for a vehicle having left-right symmetry. This is because it is highly possible that an original image of a vehicle that has a dent or deformation on the body of the vehicle due to an accident or the like is required at a later stage.

In the embodiment described above, data reduction is limited or prohibited according to the conditions (1) to (3) in a multi-level manner. However, to satisfy a severer request from the client, data reduction can be allowed for only a vehicle that satisfies any one of the conditions (1) to (3), all the conditions (1) to (3), or any combination of the conditions (1) to (3).

The component identifying unit 13*c* identifies a component in the vehicle-body area cut out of the original image by the image recognition unit 13*a*. For example, when the component identifying unit 13*c* identifies a component from a front vehicle-body area of the original image 50, the component identifying unit 13*c* identifies a specific component based on which an identification component for identifying the vehicle is defined, such as a side-mirror area, a windshield area, and a front-grill area.

More particularly, the component identifying unit 13*c* identifies side-mirror areas 500*a* and 500*b* (see FIG. 6) by matching edges of the front vehicle-body area with a distinctive shape of side mirrors (hereinafter, collectively "side-mirror areas 500").

Subsequently, the component identifying unit 13*c* detects changes in brightness within a circular range including a midpoint between the side-mirror areas 500*a* and 500*b* (a point assumed to located in a windshield 52) as the center of the circular range, identifies a series of points where changes in brightness are detected as a borderline of a windshield area 520.

After the windshield area 520 is detected, the component identifying unit 13*c* identifies an upper borderline of a front-grill area 530 using an lower borderline of the windshield area 520, detects changes in brightness from the upper borderline of the front-grill area 530 downwardly until changes in brightness are detected, and identifies an entire of the front-grill area 530 using a series of points where the changes in brightness are detected.

When the component identifying unit 13*c* identify a component from the original image 60 shot from behind the vehicle, the component identifying unit 13*c* identifies a specific component based on which an identification component for identifying the vehicle is defined, such as a taillight area and a rear-window area.

Figure 10:
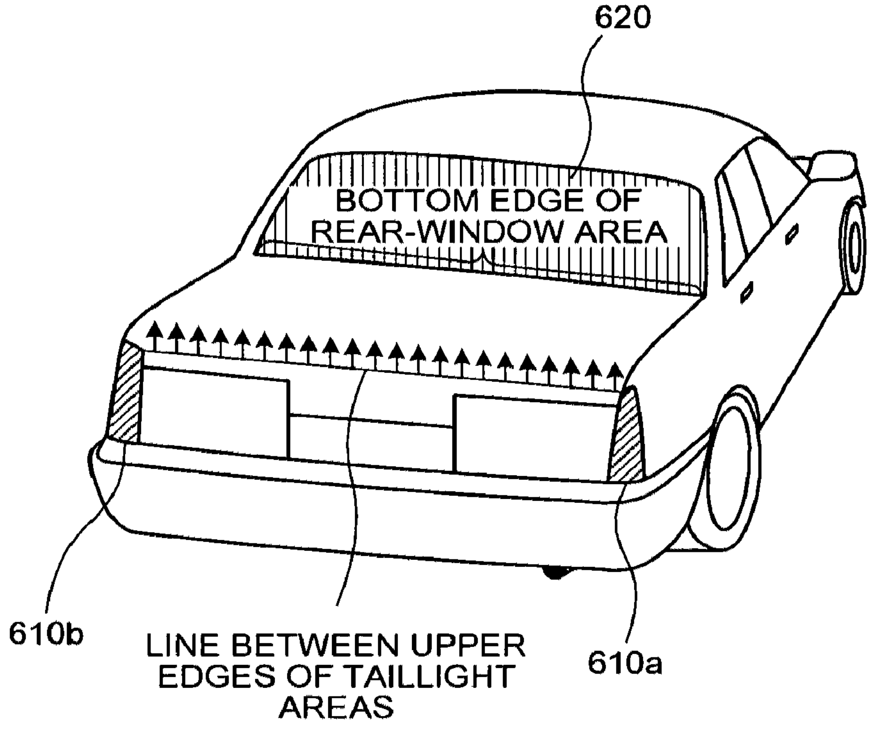
FIG. 10 is a schematic diagram of a vehicle-body area cut out of an original image shot from behind a vehicle for explaining a process performed by the component identifying unit.

More particularly, when the original image from which the component identifying unit 13*c* identifies the specific component (i.e., the original image 60) is full-colored and has a right-side body of the vehicle, the component identifying unit 13*c* identifies a taillight area 610*b* that is small in area and positioned in contact with the left edge of the vehicle-body area by detecting remarkable changes in brightness within an area in contact with the left edge of the vehicle-body area, and further identifies an area as bright as the taillight area 610*b* as a taillight area 610*a* by detecting changes in brightness toward the right side of the original image 60 from the upper right edge of the taillight area 610*b* (see FIG. 10).

Subsequently, the component identifying unit 13*c* detects changes of at least one of attributes of brightness or color, all the attributes, or combination of the attributes within the vehicle-body area from a line passing through the upper edges of the taillight areas 610*a* and 610*b* upwardly until the changes are detected, and identifies a series of points where the changes are detected as a bottom edge of a rear-window area 620.

The identification-region defining unit 13*d* defines an identification region including an identification component for identifying the vehicle based on the component identified by the component identifying unit 13*c*. In the example shown in FIG. 3, an identification region including at least one of a part of or an entire of a license plate 56, a part of or an entire of a front bumper 55, a part of or an entire of either a headlight 54*a* or a headlight 54*b*, a part of or an entire of a front grill 53, a part of or an entire of either a side-mirror 51*a* or a side-mirror 51*b*, and a part of or an entire of a manufacturer mark 57, based on the side-mirror area 500, the windshield area 520, and the front-grill area 530.

Figure 7:
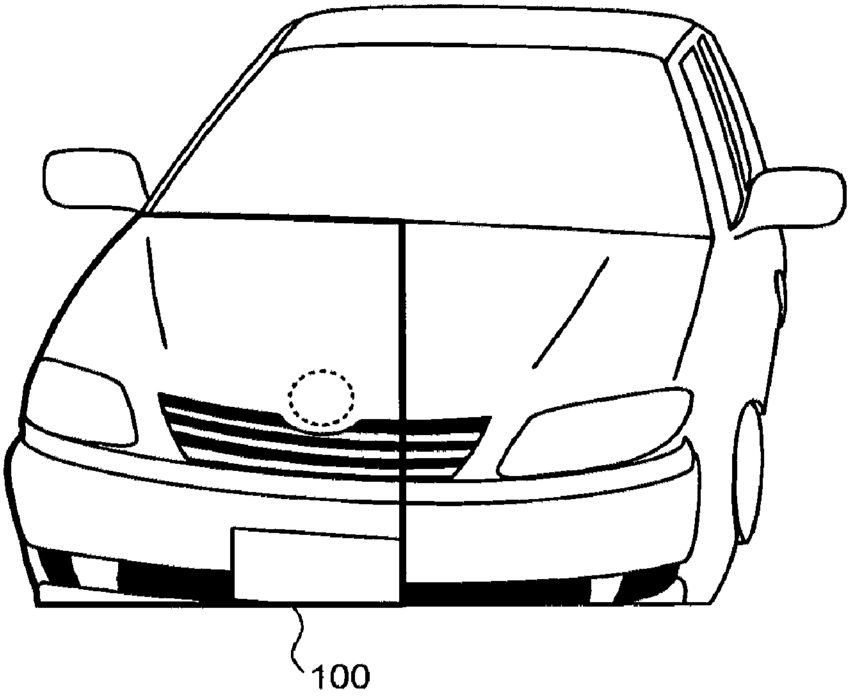
FIGS. 7 to 9 are examples of identification regions defined from the vehicle-body area shown in FIG. 6.

More particularly, as shown in FIGS. 6 and 7, when a data reduction level of the original image 50 is set to 1, the identification-region defining unit 13*d* defines a region with a width from the right edge of the vehicle-body area to the left edge of the license plate 56 and a height from the bottom edge of the vehicle-body area to the bottom edge of the windshield area 520 as an identification region 100.

Figure 8:
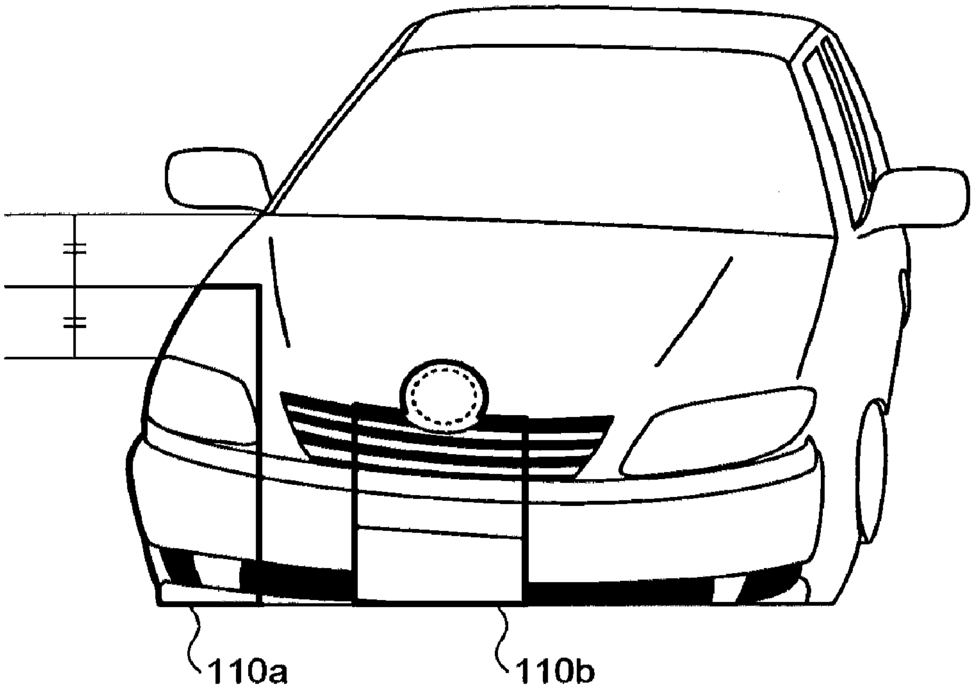

As shown in FIGS. 6 and 8, when the data reduction level of the original image 50 is set to 2, the identification-region defining unit 13*d* defines a region with a width from the right edge of the vehicle-body area to the left edge of the headlight

54*a* and a height from the bottom edge of the vehicle-body area to a line evenly between the bottom edge of the front-grill area 530 and the bottom edge of the windshield area 520 as an identification region 110*a* and, another region with a width of the license plate 56 and a height from the bottom edge of the license plate 56 to the upper edge of the front-grill area 530 as an identification region 110*b*.

Figure 9:
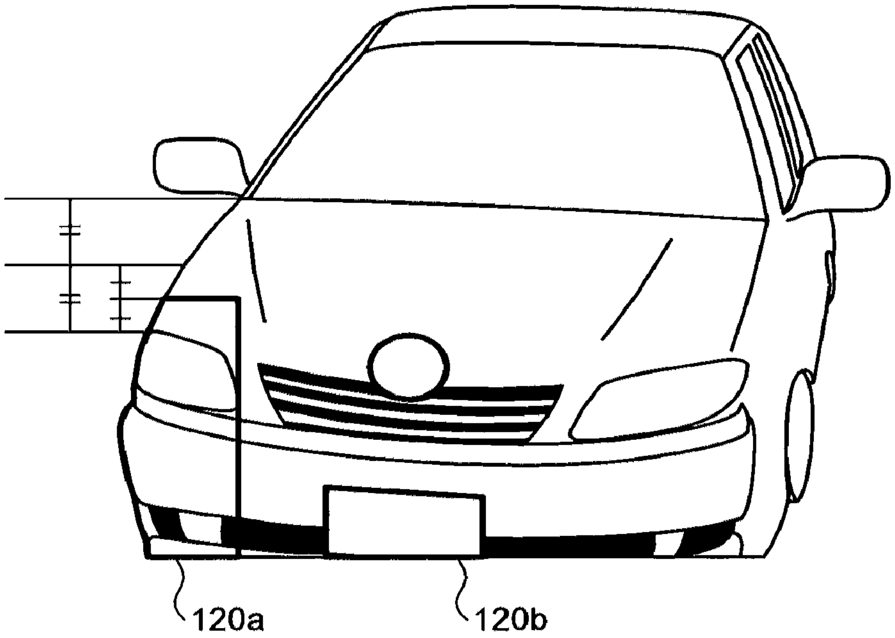

As shown in FIGS. 6 and 9, when the data reduction level of the original image 50 is set to 3, the identification-region defining unit 13*d* defines a region with a width from the right edge of the vehicle-body area to the left edge of the headlight 54*a* and a height from the bottom edge of the vehicle-body area to a line located from the bottom edge of the front-grill area 530 by a quarter length between the bottom edge of the front-grill area 530 and the bottom edge of the windshield area 520 as an identification region 120*a* and, another region removing the other area than both the license plate 56 and the manufacturer mark 57 from the identification region 110*b*, i.e., a set of the license plate 56 and the manufacturer mark 57 as an identification region 120*b*.

As described above, it is possible to define the identification region including a part of the front grill 53, the headlight 54*a*, a part of the front bumper 55, the license plate 56, and the manufacturer mark 57. In other words it is possible to reduce the data volume of the vehicle image, maintaining required information for identifying the vehicle.

When the data reduction level of the original image 50 is set to 0, the identification-region defining unit 13*d* sets the vehicle-body area as the identification region, without performing the identification-region defining process.

In another example shown in FIG. 4, the identification region including at least one of a part of or an entire of a license plate 63, a part of or an entire of a rear grill 66, a part of or an entire of a rear bumper 67, a part of or an entire of either a taillight 61*a* or a taillight 61*b*, a part of or an entire of a brake light 65, and a part of or an entire of a manufacturer mark 64, based on the taillight area 610 and the rear-window area 620.

Figure 11:
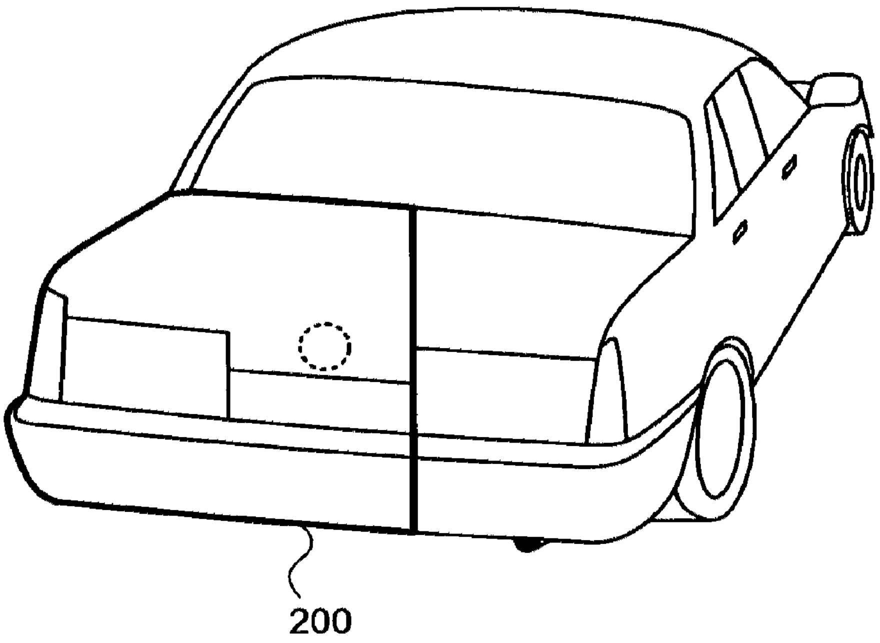
FIGS. 11 to 13 are examples of identification regions defined from the vehicle-body area shown in FIG. 10.

More particularly, as shown in FIGS. 10 and 11, when a data reduction level of the original image 60 is set to 1, the identification-region defining unit 13*d* defines a region with a width from the left edge of the vehicle-body area to the right edge of the license plate 63 and a height from the bottom edge of the vehicle-body area to the bottom edge of the rear-window area 620 as an identification region 200.

Figure 12:
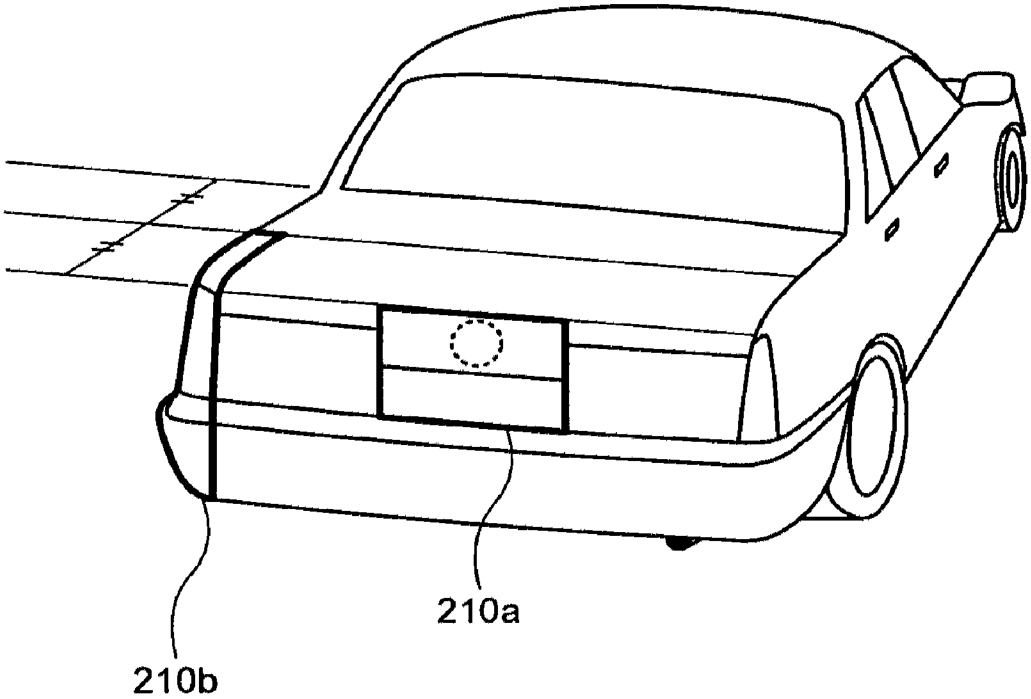

As shown in FIGS. 10 and 12, when the data reduction level of the original image 60 is set to 2, the identification-region defining unit 13*d* defines a region with a width from the left edge of the vehicle-body area to the right edge of the taillight area 610*b* and a height from the bottom edge of the vehicle-body area to a line evenly between a line passing through the upper edges of the taillight areas 610*a* and 610*b* and the bottom edge of the rear-window area 620 as an identification region 210*b*, and another region with a width of the license plate 63 and a height from the bottom edge of the license plate 63 to the line passing through the upper edges of the taillight areas 610*a* and 610*b* as an identification region 210*a*.

Figure 13:
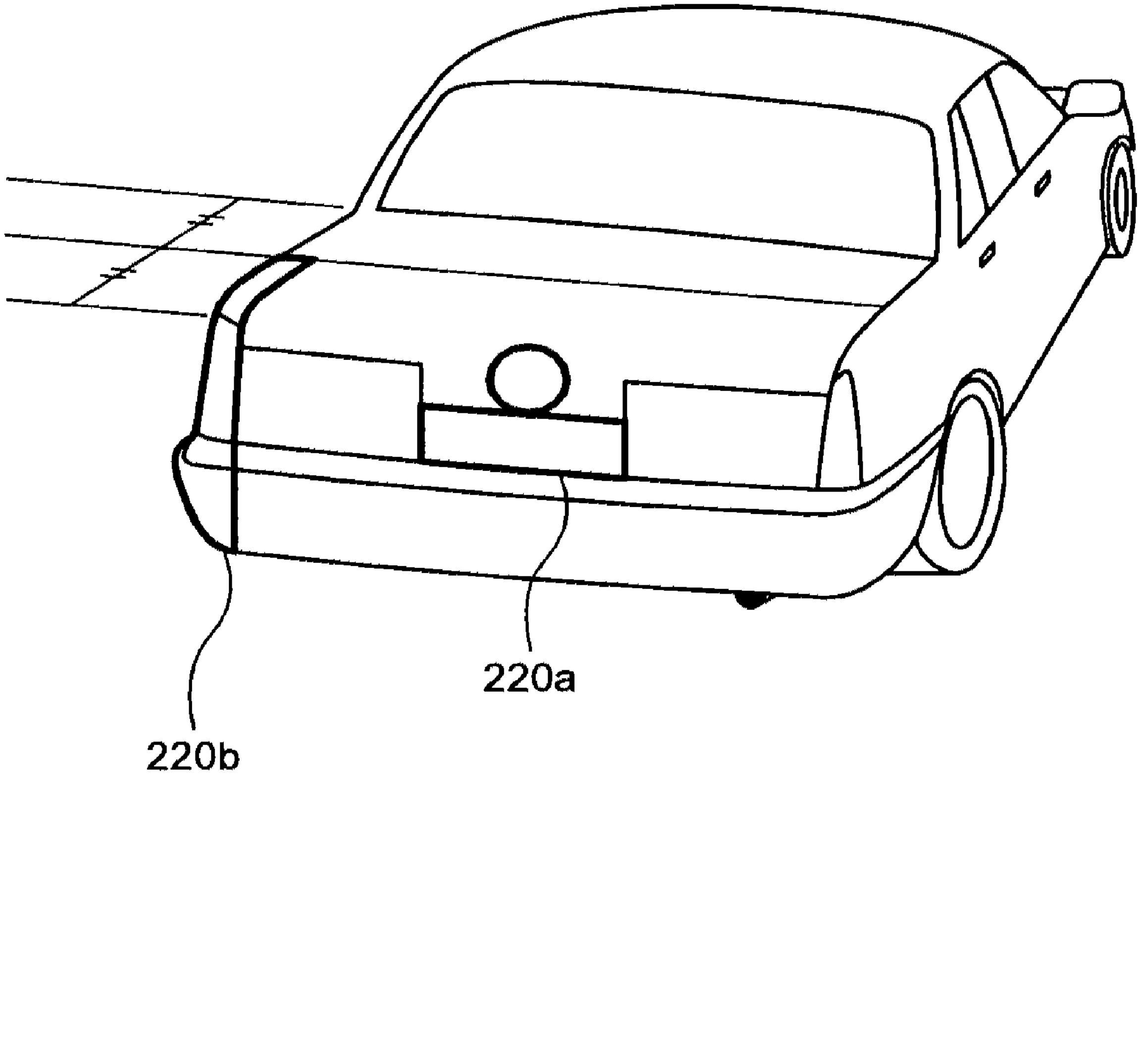

As shown in FIGS. 10 and 13, when the data reduction level of the original image 60 is set to 3, the identification-region defining unit 13*d* defines a region with a width from the left edge of the vehicle-body area to the right edge of the taillight area 610*b* and a height from the bottom edge of the vehicle-body area to a line evenly between the line passing through the upper edges of the taillight areas 610*a* and 610*b* and the bottom edge of the rear-window area 620 as an identification region 220*b*, and another region removing the other area than both the license plate 63 and the manufacturer mark 64 from the identification region 210*a*, i.e., a set of the license plate 63 and the manufacturer mark 64 as an identification region 220*a*.

As described above, it is possible to define the identification region including the taillight 61*b*, the license plate 63, the manufacturer mark 64, the rear grill 66, and the rear bumper 67. In other words, it is possible to reduce the data volume of the vehicle image, maintaining required information for identifying the vehicle. When the data reduction level of the original image 60 is set to 1, the brake light 65 is included in the identification region.

When the data reduction level of the original image 60 is set to 0, the identification-region defining unit 13*d* sets the vehicle-body area as the identification region, without performing the identification-region defining process.

The vehicle-image generating unit 13*e* extracts the identification region defined by the identification-region defining unit 13*d* out of the vehicle-body area, and generates the vehicle image based on the extracted identification region. More particularly, the vehicle-image generating unit 13*e* generates the vehicle image by pasting the identification region on a frame having a constant pixel value in an area other than an address of the identification region.

Figure 14:
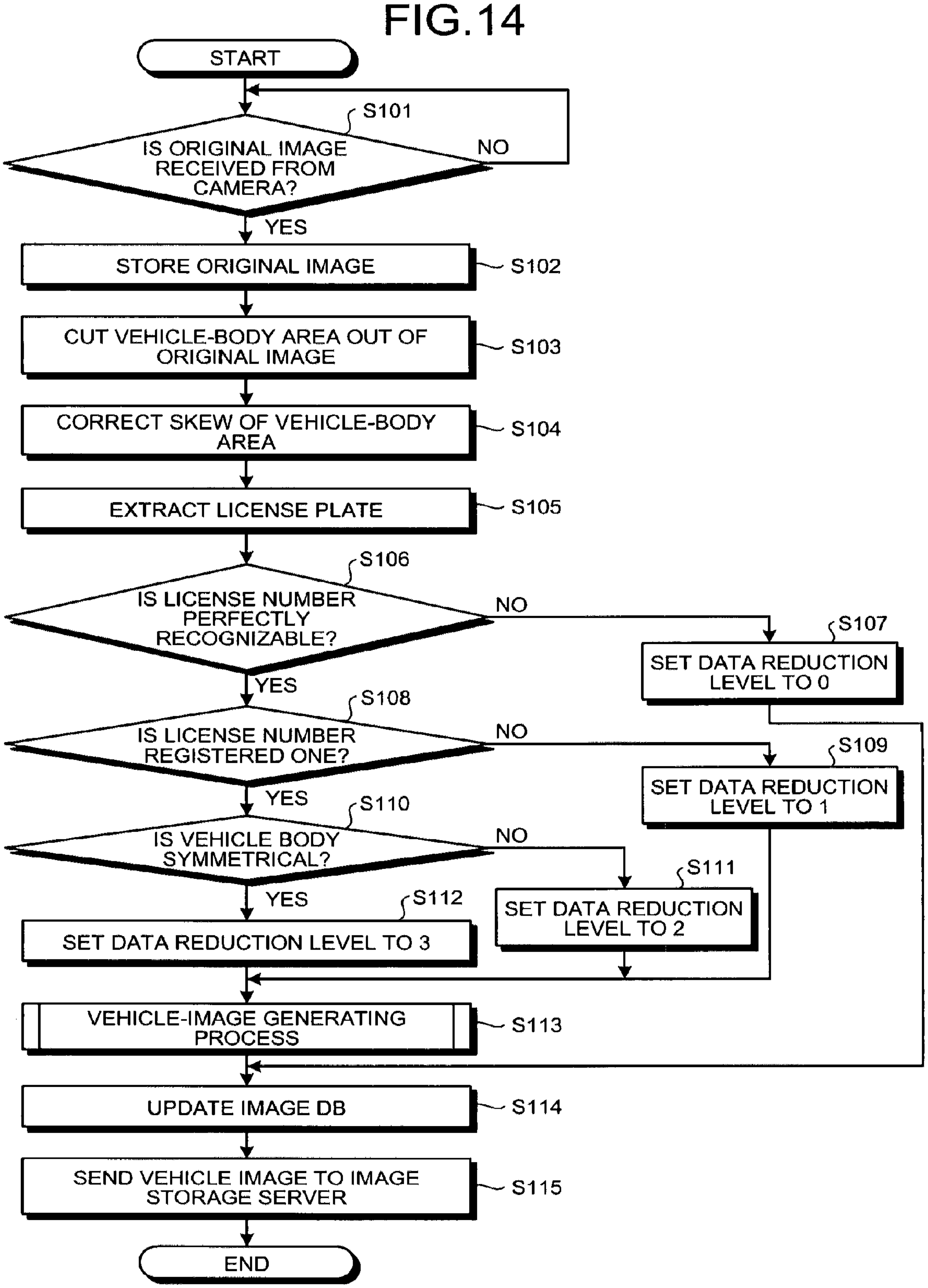
FIG. 14 is a flowchart of a basic process performed by the recognition device.

FIG. 14 is a flowchart of the basic process performed by the recognition device 10. Upon receiving an original image from the camera 20 (Yes at step S101), the image management unit 13 stores the original image in the image DB 12 (step S102).

The image recognition unit 13*a* estimates a rough position of a vehicle in the original image (for example, the original image 50 or 60), and detects edges of the vehicle at the estimated position to cut a front or rear vehicle-body area out of the original image 50 or 60 (step S103). The image recognition unit 13*a* corrects the skew of the vehicle-body area (step S104), and extracts a license plate of the vehicle from the corrected vehicle-body area (step S105).

When the image recognition unit 13*a* determines that it is impossible to recognize all numbers and letters on the license plate (No at step S106), the data reduction-level setting unit 13*b* sets the data reduction level to 0 (step S107).

When the image recognition unit 13*a* determines that it is possible to recognize all numbers and letters on the license plate (Yes at step S106) and that the license number is an unregistered one (No at step S108), the data reduction-level setting unit 13*b* sets the data reduction level to 1 (step S109).

When the image recognition unit 13*a* determines that it is possible to recognize all numbers and letters on the license plate (Yes at step S106), that the license number is a registered one (Yes at step S108), and that the skew-corrected vehicle-body area does not have left-right symmetry (No at step S110), the data reduction-level setting unit 13*b* sets the data reduction level to 2 (step S111).

When the image recognition unit 13*a* determines that it is possible to recognize all numbers and letters on the license plate (Yes at step S106), that the license number is a registered one (Yes at step S108), and that the skew-corrected vehicle-body area has left-right symmetry (Yes at step S110), the data reduction-level setting unit 13*b* sets the data reduction level to 3 (step S112).

After the data reduction level is set, the image management unit 13 causes the component identifying unit 13*c*, the identification-region defining unit 13*d*, and the vehicle-image generating unit 13*e* to perform the vehicle-image generating process for the vehicle-body area with the data reduction level set to any one of 1 to 3 (step S113).

At the end of the process, the image management unit 13 updates the original image 50 or 60 stored in the image DB 12 to the vehicle image that is the resultant of the vehicle-image generating process (step S114), and sends the vehicle image to the image storage server 30 via the communication unit 11 (step S115).

When the data reduction level of the original image is set to 0, the image DB 12 is overwritten with the vehicle-body area cut out of the original image.

Figure 15:
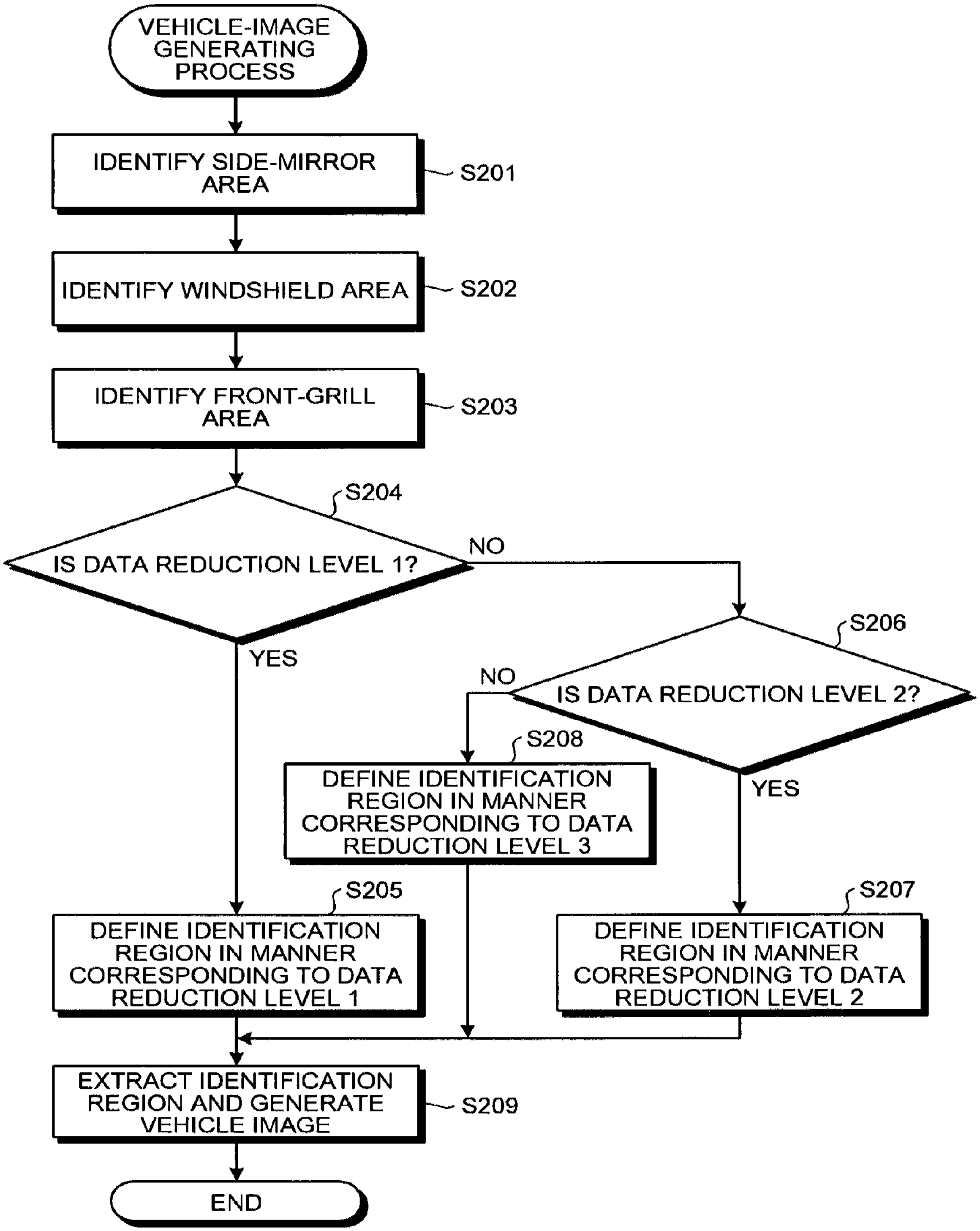
FIG. 15 is a detailed flowchart of an example of a vehicle-image generating process shown in FIG. 14.

FIG. 15 is a detailed flowchart of the vehicle-image generating process performed at step S113 of FIG. 14 for generating a vehicle image from an original image shot from the front of the vehicle. After the data reduction-level setting unit 13*b* sets the data reduction level of the original image 50, the component identifying unit 13*c* identifies the side-mirror areas 500*a* and 500*b* by matching edges of the vehicle-body area with a distinctive shape of side mirrors (step S201).

As shown in FIG. 6, the component identifying unit 13*c* detects changes in brightness in a circular range including a midpoint between the side-mirror areas as the center of the circular range, identifies the windshield area 520 based on a series of points where changes in brightness are detected (step S202).

After the windshield area 520 is detected, the component identifying unit 13*c* identifies the upper borderline of the front-grill area 530 using the lower borderline of the windshield area 520, detects changes in brightness from the upper borderline of the front-grill area 530 downwardly until changes in brightness are detected, and identifies the entire front-grill area 530 using a series of points where the changes in brightness are detected (step S203).

When the data reduction level of the original image 50 is set to 1 (Yes at step S204), as shown in FIGS. 6 and 7, the identification-region defining unit 13*d* defines a region with a width from the right edge of the vehicle-body area to the left edge of the license plate 56 and a height from the bottom edge of the vehicle-body area to the bottom edge of the windshield area 520 as the identification region 100 (step S205).

When the data reduction level of the original image 50 is set to 2 (No at step S204 and Yes at step S206), as shown in FIGS. 6 and 8, the identification-region defining unit 13*d* defines a region with a width from the right edge of the vehicle-body area to the left edge of the headlight 54*a* and a height from the bottom edge of the vehicle-body area to a line evenly between the bottom edge of the front-grill area 530 and the bottom edge of the windshield area 520 as the identification region 110*a* and, another region with a width of the license plate 56 and a height from the bottom edge of the license plate 56 to the upper edge of the front-grill area 530 as the identification region 110*b* (step S207).

When the data reduction level of the original image 50 is set to 3 (No at step S204 and No at step S206), as shown in FIGS. 6 and 9, the identification-region defining unit 13*d* defines a region with a width from the right edge of the vehicle-body area to the left edge of the headlight 54*a* and a height from the bottom edge of the vehicle-body area to a line located from the bottom edges of the front-grill area 530 by a quarter length between the bottom edges of the front-grill area 530 and the windshield area 520 as the identification region 120*a* and, another region removing other than the license plate 56 and the manufacturer mark 57 from the identification region 110*b*, that is, a set of the license plate 56 and the manufacturer mark 57 as the identification region 120*b* (step S208).

At the end of the process, the vehicle-image generating unit 13*e* generates the vehicle image by pasting the identification region on a frame having a constant pixel value in an area other than, an address of the identification region (step S209).

Figure 16:
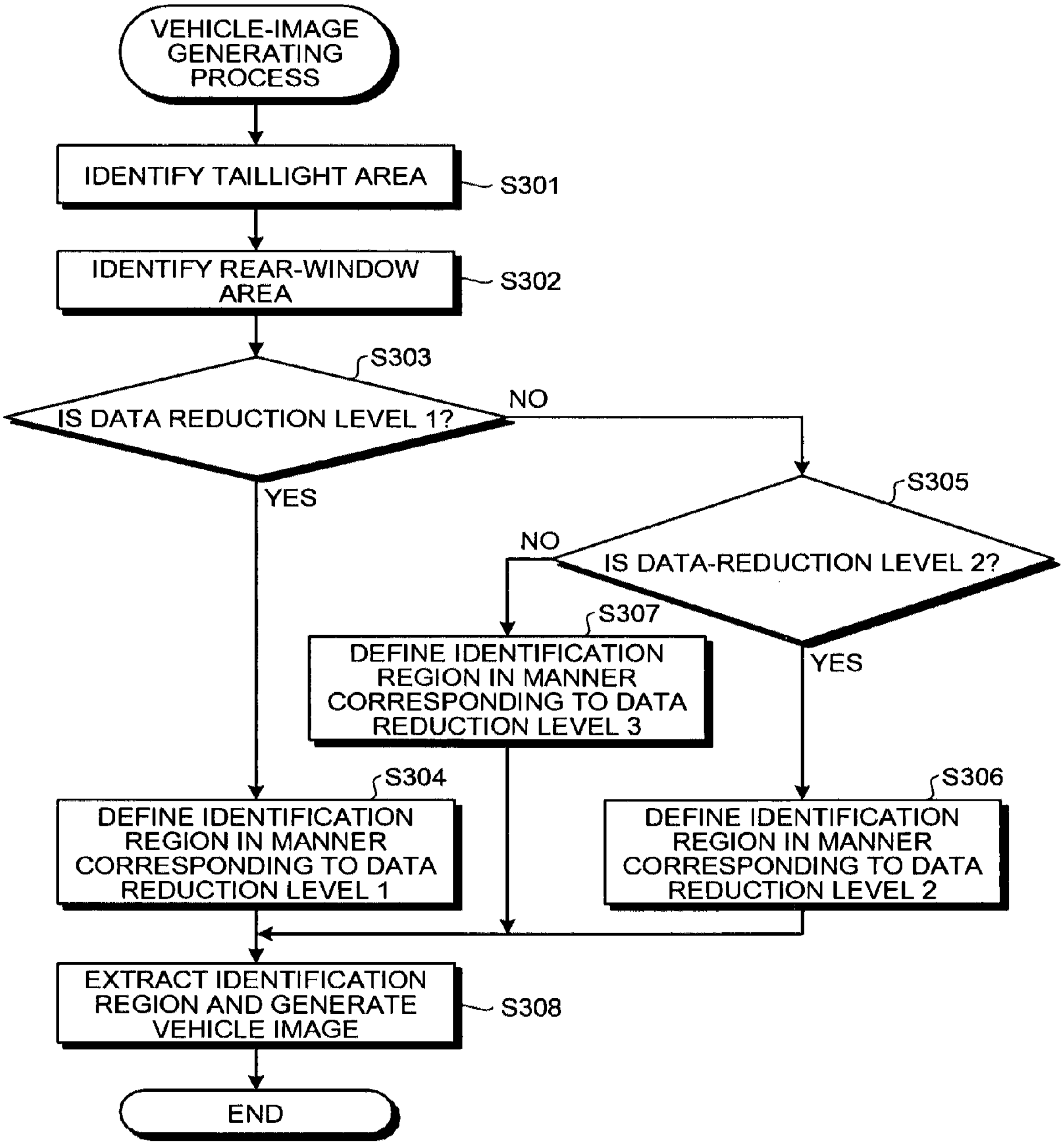
FIG. 16 is a detailed flowchart of another example of the vehicle-image generating process.

FIG. 16 is a detailed flowchart of the vehicle-image generating process performed at step S113 of FIG. 14 for generating a vehicle image from an original image shot from behind the vehicle. When the original image from which the component identifying unit 13*c* identifies the specific component (i.e., the original image 60) is full-colored and has a right-side body of the vehicle, the component identifying unit 13*c* identifies the taillight area 610*b* that is small in area and positioned in contact with the left edge of the vehicle-body area by detecting remarkable changes in brightness within an area in contact with the left edge of the vehicle-body area, and further identifies an area as bright as the taillight area 610*b* as the taillight area 610*a* by detecting changes in brightness toward the right side of the original image 60 from the upper right edge of the taillight area 610*b* (step S301).

Subsequently, the component identifying unit 13*c* detects, as shown in FIG. 10, changes of at least one of attributes including brightness and color, all the attributes, or combination of the attributes within the vehicle-body area from a line between the upper edges of the taillight areas 610*a* and 610*b* upwardly until the changes are detected, and identifies a series of points where the changes are detected as the bottom edge of the rear-window area 620 (step S302).

When the data reduction level of the original image 60 is set to 1 (Yes at step S303), as shown in FIGS. 10 and 11, the identification-region defining unit 13*d* defines a region with a width from the left edge of the vehicle-body area to the right edge of the license plate 63 and a height from the bottom edge of the vehicle-body area to the bottom edge of the rear-window area 620 as the identification region 200 (step S304).

When the data reduction level of the original image 60 is set to 2 (No at step S303 and Yes at step S305), as shown in FIGS. 10 and 12, the identification-region defining unit 13*d* defines a region with a width from the left edge of the vehicle-body area to the right edge of the taillight area 610*b* and a height from the bottom edge of the vehicle-body area to a line evenly between a line passing through the upper edges of the taillight areas 610*a* and 610*b* and the bottom edge of the rear-window area 620 as the identification region 210*b*, and another region with a width of the license plate 63 and a height from the bottom edge of the license plate 63 to the line passing through the upper edges of the taillight areas 610*a* and 610*b* as the identification region 210*a* (step S306).

When the data reduction level of the original image 60 is set to 3 (No at step S303 and No at step S305), as shown in FIGS. 10 and 13, the identification-region defining unit 13*d* defines a region with a width from the left edge of the vehicle-body area to the right edge of the taillight area 610*b* and a height from the bottom edge of the vehicle-body area to a line evenly between the line passing through the upper edges of the taillight areas 610*a* and 610*b* and the bottom edge of the rear-window area 620 as the identification region 220*b*, and another region removing the other area than both the license plate 63 and the manufacturer mark 64 from the identification region 210*a*, i.e., a set of the license plate 63 and the manufacturer mark 64 as the identification region 220*a* (step S307).

At the end of the process, the vehicle-image generating unit 13*e* generates the vehicle image by pasting the identification region on a frame having a constant pixel value in an area other than an address of the identification region (step S308).

As described above, the recognition device 10 identifies the component in the original image, defines the identification region including the identification component for identifying the vehicle based on the component, extracts the identification region from the original image, and generates the vehicle image based on the extracted identification region. As a result, the vehicle image including information required for identifying the vehicle is generated, which makes it possible to effectively reduce the data volume of the original image.

Figure 17:
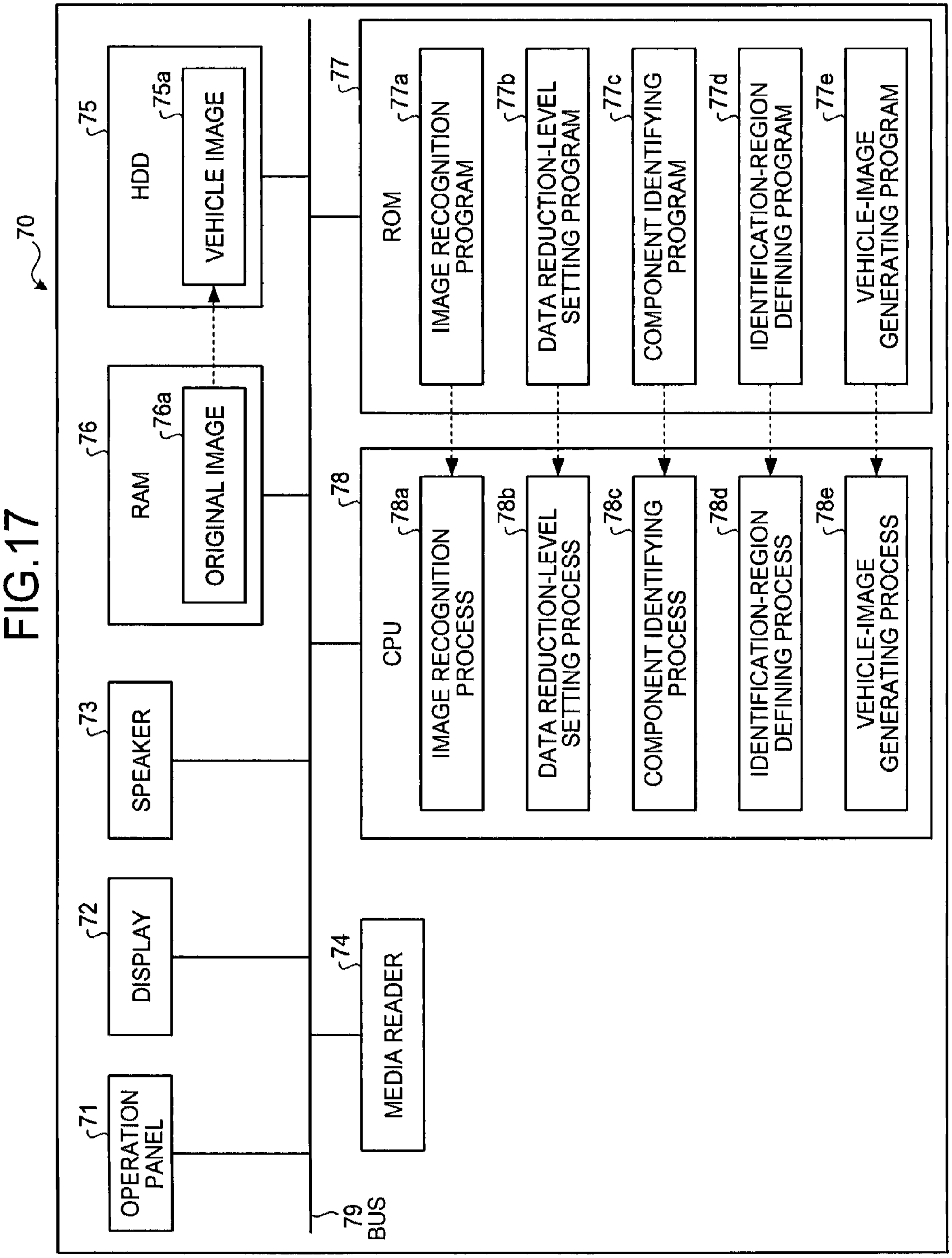
FIG. 17 is a functional block diagram of a computer that executes a vehicle-image generating program.

A computer program (hereinafter, "vehicle-image generating program") can be executed on a computer to implement the vehicle-image generating process described above. An example of such a computer is explained below. FIG. 17 is a functional block diagram of a computer 70 that executes the vehicle-image generating program.

The computer 70 includes an operation panel 71, a display 72, a speaker 73, a media reader 74, a hard disk device (HDD) 75, a random access memory (RAM) 76, a read only memory (ROM) 77, and a central processing unit (CPU) 78. Those units are connected to each other via a bus 79.

The vehicle-image generating program, which is executed on the computer 70 to implement the same functions as described above, is prestored in the ROM 77. The vehicle-image generating program includes an image recognition program 77*a*, a data reduction-level setting program 77*b*, a component identifying program 77*c*, an identification-region defining program 77*d*, and a vehicle-image generating program 77*e*. Those programs 77*a* to 77*e* can be integrated or decentralized in the similar manner for the units of the recognition device 10 shown in FIG. 2.

The CPU 78 reads the programs 77*a* to 77*e* from the ROM 77 and executes them. As a result, the programs 77*a* to 77*e* perform an image recognition process 78*a*, a data reduction-level setting process 78*b*, a component identifying process 78*c*, an identification-region defining process 78*d*, and a vehicle-image generating process 78*e*, respectively. The processes 78*a* to 78*e* correspond to the image recognition unit 13*a*, the data reduction-level setting unit 13*b*, the component identifying unit 13*c*, the identification-region defining unit 13*d*, and the vehicle-image generating unit 13*e*, those units shown in FIG. 2, respectively.

The CPU 78 stores an original image 76*a* received from the camera 20 in the RAM 76, generates a vehicle image by performing the vehicle-image generating process for the original image 76*a*, stores the resultant vehicle image in the HDD 75, and sends a vehicle image 75*a* that is stored in the HDD 75 to the image storage server 30.

It is not necessary to prestore the programs 77*a* to 77*e* in the ROM 77. The programs 77*a* to 77*e* can be stored in a portable physical medium that can be connected to the computer 70, or in a fixed physical medium that is installable inside or outside the computer 70. Examples of the portable physical medium include a flexible disk (FD), a compact disk-read only memory (CD-ROM), an MO, a digital versatile disk (DVD), a magnetooptical disk, and an integrated circuit (IC) card. Examples of the fixed physical medium include an HDD. In addition, it is allowable that the programs 77*a* to 77*e* are stored in another computer (or a server) connected to the computer 70 via a network such as a public line, the Internet, a LAN, and a wide area network (WAN), and downloaded therefrom to be executed on the computer 70.

Incidentally, the above-described embodiment is susceptible of various modifications. For example, the image management unit 13 is explained as integrally including the component identifying unit 13*c*, the identification-region defining unit 13*d*, and the vehicle-image generating unit 13*e*. However, the image storage server 30 can include the above functional units, or the functional units can be separately located on the recognition device 10 and the image storage server 30 so that the separately located units form at least one set of the functional units.

It is also allowable to build up a vehicle-image management system for checking whether a registered possessor drives his own vehicle by identifying a driver in the windshield area 520 under interaction between the image storage server 30 and the client terminal 40.

Moreover, in the identification-region defining process, the identification-region defining unit 13*d* can define an identification region including an identification component with a body color that makes it possible to recognize a vehicle or a model of the vehicle.

Of the processes (such as the vehicle-image generating process) described in the embodiments, all or part of the processes explained as being performed automatically can be performed manually. Similarly, all or part of the processes explained as being performed manually can be performed automatically by a known method. Processing procedures, control procedures, specific names, information including various data and parameters described in the embodiment or the drawings can be changed as required unless otherwise specified.

The constituent elements of the devices shown in the drawings are merely functionally conceptual, and need not be physically configured as illustrated. In other words, the units (such as the recognition device 10 and the image storage server 30), as a whole or in part, can be separated or integrated either functionally or physically based on various types of loads or use conditions As set forth hereinabove, according to an embodiment of the present invention, information necessary for identifying a vehicle is extracted from an original image, and a vehicle image is generated based on the information. Thus, the vehicle image with less data volume than the original image is available for identification.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A non-transitory computer-readable recording medium that stores therein a computer program for generating a vehicle image for identifying a vehicle from an original image, the computer program causing a computer to execute:

cutting a vehicle-body area out of the original image;

checking whether it is possible to recognize all numbers and letters on a license plate extracted from the vehicle-body area or not;

setting a data reduction level for limiting or prohibiting data reduction of the original image in a multi-level based on a result of the checking;

identifying a component of the vehicle in the vehicle-body area;

defining an identification region including an identification component for identifying the vehicle based on the component and the data reduction level;

extracting the identification region from the original image; and generating the vehicle image based on extracted identification region.

2. The non-transitory computer-readable recording medium according to claim 1, wherein, when the original image is shot from front of the vehicle, the identifying includes identifying at least one of a license plate, a front bumper, a headlight, a front grill, a side mirror, and a manufacturer mark in the original image as the component, and the defining includes defining the identification region including whole or part of the component.

3. The non-transitory computer-readable recording medium according to claim 1, wherein, when the original image is shot from behind the vehicle, the identifying includes identifying at least one of a license plate, a rear bumper, a taillight, a brake light, and a manufacturer mark in the original image as the component, and the defining includes defining the identification region including whole or part of the component.

4. A vehicle image generating apparatus that generates a vehicle image for identifying a vehicle from an original image, the vehicle image generating apparatus comprising:

an image recognition unit that cuts a vehicle-body area out of the original image, and checks whether it is possible to recognize all numbers and letters on a license plate extracted from the vehicle-body area or not;

a level setting unit that sets a data reduction level for limiting or prohibiting data reduction of the original image in a multi-level based on a result of the check by the image recognition unit;

an identifying unit that identifies a component of the vehicle in the vehicle-body area;

a defining unit that defines an identification region including an identification component for identifying the vehicle based on the component and the data reduction level; and a generating unit that extracts the identification region from the original image, and generates the vehicle image based on extracted identification region.

5. The vehicle image generating apparatus according to claim 4, wherein, when the original image is shot from front of the vehicle, the identifying unit identifies at least one of a license plate, a front bumper, a headlight, a front grill, a side mirror, and a manufacturer mark in the original image as the component, and the defining units defines the identification region including whole or part of the component.

6. The vehicle image generating apparatus according to claim 4, wherein, when the original image is shot from behind the vehicle, the identifying unit identifies at least one of a license plate, a rear bumper, a taillight, a brake light, and a manufacturer mark in the original image as the component, and the defining units defines the identification region including whole or part of the component.

7. A vehicle image generating method for generating a vehicle image for identifying a vehicle from an original image, the vehicle image generating method comprising:

cutting a vehicle-body area out of the original image;

checking whether it is possible to recognize all numbers and letters on a license plate extracted from the vehicle-body area or not;

setting a data reduction level for limiting or prohibiting data reduction of the original image in a multi-level based on a result of the checking;

identifying a component of the vehicle in the vehicle-body area;

defining an identification region including an identification component for identifying the vehicle based on the component and the data reduction level;

extracting the identification region from the original image; and generating the vehicle image based on extracted identification region.

8. The vehicle image generating method according to claim 7, wherein, when the original image is shot from front of the vehicle, the identifying includes identifying at least one of a license plate, a front bumper, a headlight, a front grill, a side mirror, and a manufacturer mark in the original image as the component, and the defining includes defining the identification region including whole or part of the component.

9. The vehicle image generating method according to claim 7, wherein, when the original image is shot from behind the vehicle, the identifying includes identifying at least one of a license plate, a rear bumper, a taillight, a brake light, and a manufacturer mark in the original image as the component, and the defining includes defining the identification region including whole or part of the component.

10. The non-transitory computer-readable recording medium according to claim 1, wherein, the checking includes checking whether a license number on the license plate is a registered one or not.

11. The non-transitory computer-readable recording medium according to claim 10, wherein, the checking includes checking whether the vehicle-body area has left-right symmetry or not.

12. The vehicle image generating apparatus according to claim 4, wherein, the image recognition unit further checks whether a license number on the license plate is a registered one or not.

13. The vehicle image generating apparatus according to claim 12, wherein, the image recognition unit further checks whether the vehicle-body area has left-right symmetry or not.

14. The non-transitory computer-readable recording medium according to claim 7, wherein, the checking includes checking whether a license number on the license plate is a registered one or not.

15. The non-transitory computer-readable recording medium according to claim 14, wherein, the checking includes checking whether the vehicle-body area has left-right symmetry or not.

* * * * *

UNITED STATES PATENT AND TRADEMARK OFFICE

CERTIFICATE OF CORRECTION

PATENT NO. : 8,290,211 B2
APPLICATION NO. : 11/882585
DATED : October 16, 2012
INVENTOR(S) : Kunikazu Takahashi It is certified that error appears in the above-identified patent and that said Letters Patent is hereby corrected as shown below:

Title page, please add Item (63) Related U.S. Application Data, Continuation of application No. PCT/JP2005/001621, filed on February 3, 2005.

Signed and Sealed this
Twenty-ninth Day of January, 2013

David J. Kappos
*Director of the United States Patent and Trademark Office*